June 18, 1946.   C. C. DAVENPORT   2,402,377
TURBINE APPARATUS
Filed Feb. 9, 1943   2 Sheets-Sheet 1
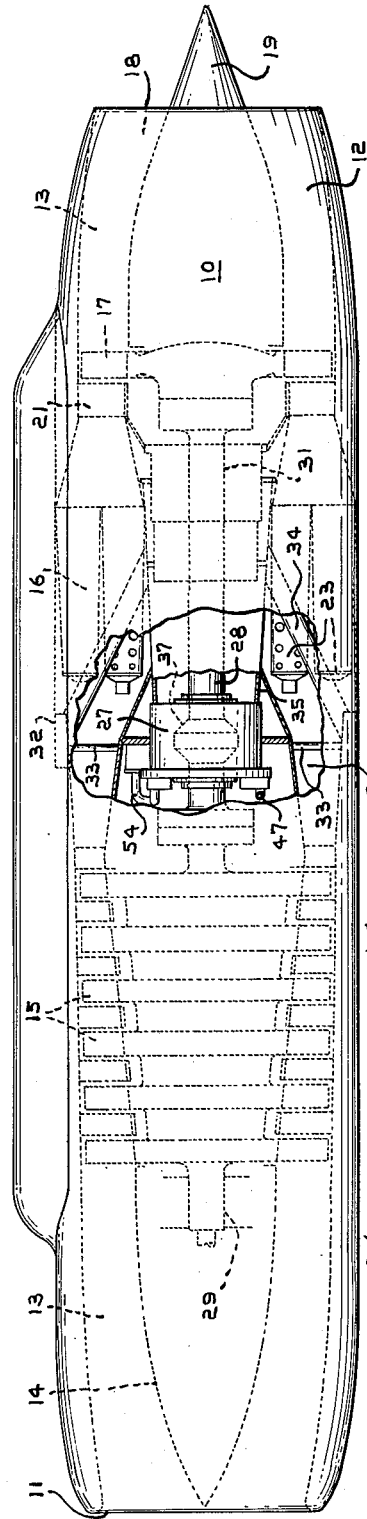
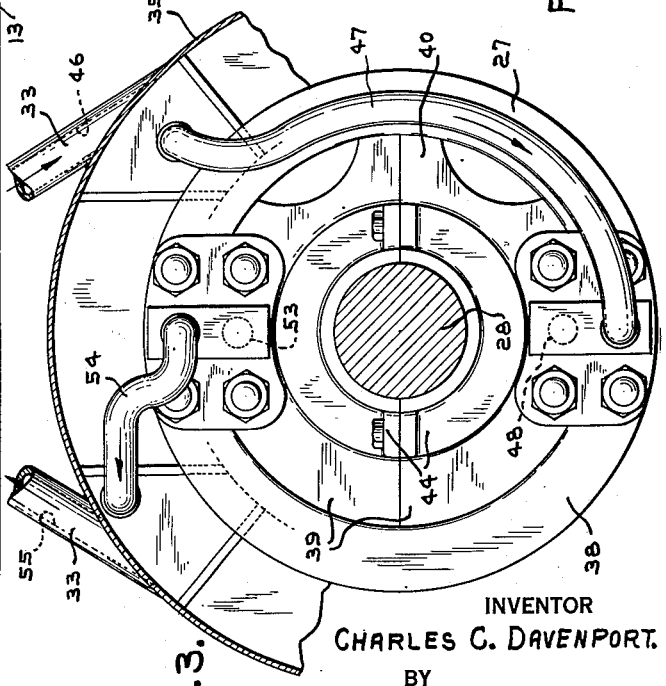
INVENTOR
CHARLES C. DAVENPORT.
BY
ATTORNEY

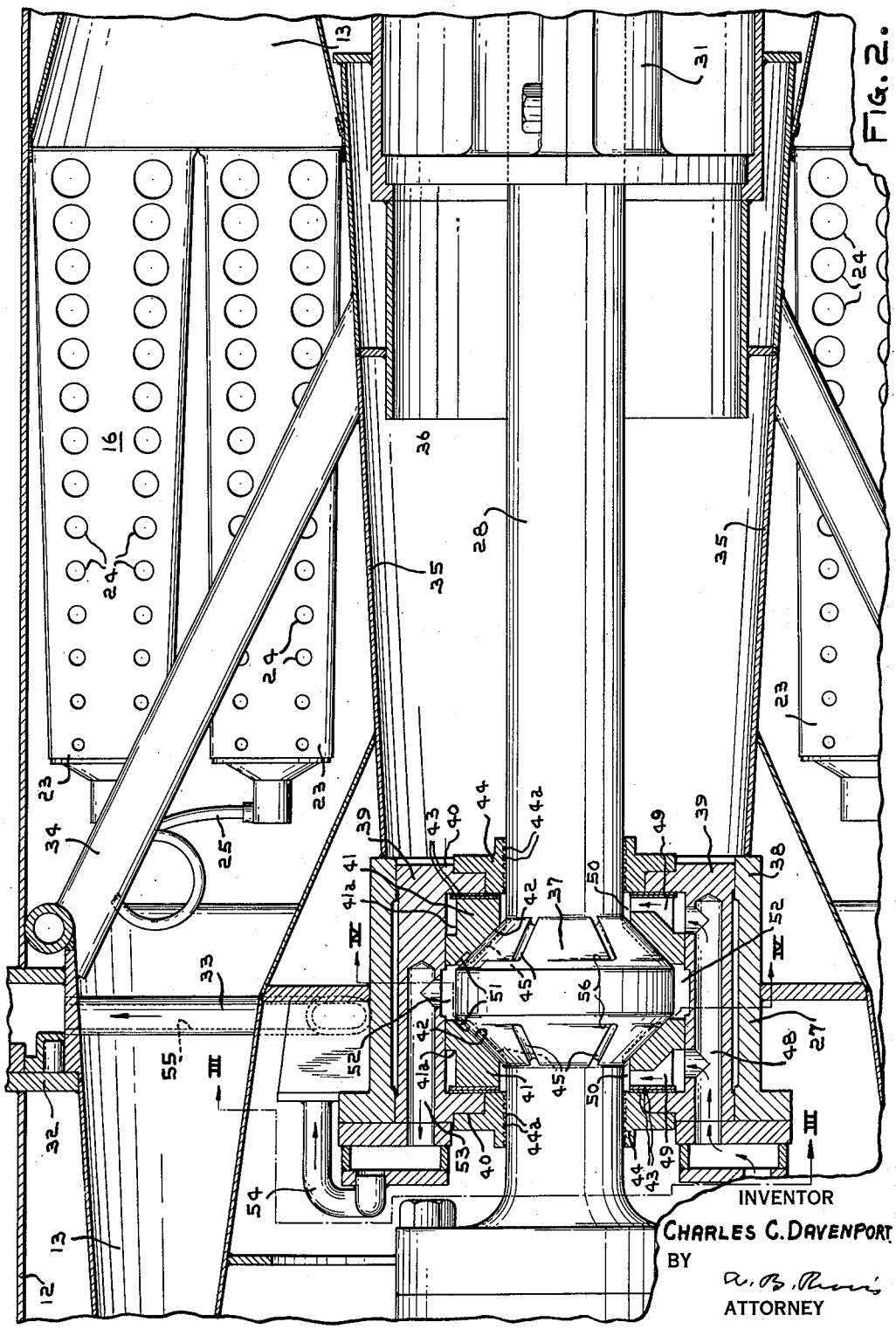

Patented June 18, 1946

2,402,377

UNITED STATES PATENT OFFICE 2,402,377

TURBINE APPARATUS

Charles C. Davenport, Media, Pa., assignor to Westinghouse Electric Corporation, East Pittsburgh, Pa., a corporation of Pennsylvania Application February 9, 1943, Serial No. 475,257

5 Claims. (Cl. 308—36)

This invention relates to the propulsion of aircraft and particularly to the construction of an aerial power plant for effecting propulsion at high speeds, and it has for an object to provide an improved bearing construction for devices of the character set forth.

In order to propel aircraft at high speeds, it has been proposed to employ a power plant functioning on the nonregenerative Joule cycle. Such a power plant may include an air compressor, a combustion apparatus, and a gas turbine compactly arranged in series to keep the overall diameter of the unit at a minimum. These parts are mounted centrally within and supported by an outer casing of streamline form which directs the flow of air through the power plant.

The turbine is driven at high speed by the hot compressed air provided by the compressor and combustion apparatus and extracts at least sufficient power from this hot compressed air to drive the compressor. The remainder of the available power may be utilized to propel the aircraft by ejecting the air from a propulsion jet rearwardly of the turbine.

The turbine and compressor rotors are preferably carried on a common shaft which is supported by two or more bearings rigidly connected to the outer casing. This shaft may operate at speeds as high as 20,000 R. P. M. and is subjected to both radial and thrust loads which may change rapidly in direction and magnitude. It is important, therefore, that a lubricating film be maintained between the bearing surfaces at all times regardless of load conditions.

It is, accordingly, an object of the invention to provide an improved bearing capable of withstanding rapid changes in bearing loads without failure of the lubricating film.

It is, of course, desirable to keep the weight and size of a power plant of the type mentioned at a minimum to obtain a high ratio of horsepower to weight of the power plant and to reduce air friction losses of the aircraft.

It is, therefore, a further object of the invention to provide an improved bearing which is compact and capable of handling both thrust and radial bearing loads.

These and other objects are effected by the invention as will be apparent from the following description and claims taken in connection with the accompanying drawings, forming a part of this application, in which:

Fig. 1 is a side elevation of a power plant, with a portion of the outer casing broken away, in which the bearing construction of the present invention has been incorporated;

Fig. 2 is a longitudinal sectional view of the exposed portion of Fig. 1;

Fig. 3 is a sectional view taken substantially on the line III—III of Fig. 2;

Fig. 4 is a sectional view taken substantially on the line IV—IV of Fig. 2;

Fig. 5 is a sectional view taken substantially along the line V—V of Fig. 4; and Fig. 6 is a developed sectional view taken substantially along the line VI—VI of Fig. 4.

The power plant shown in Fig. 1 and generally indicated 10 is adapted to be mounted in or on the fuselage or wings of an airplane, with the left or intake end 11, as viewed in this figure, pointed in the direction of flight. The power plant comprises an outer shell or casing structure 12 providing an air duct 13 extending fore and aft with respect to the aircraft. This casing has mounted therein along its longitudinal axis, a nose portion 14 in which fuel and lubricating oil pumps and ignition apparatus may be supported, an axial flow compressor 15, combustion apparatus 16, a turbine 17, and a propulsion jet 18 defined by the casing 12 and a tailpiece 19 mounted concentrically therein. Air enters at the intake end 11, flows through the compressor 15 where it is compressed, and into the combustion apparatus where it is heated. The heated compressed air on leaving the combustion apparatus is directed by suitable guide vanes or nozzles 21 against the blades of the turbine rotor 17 and then discharged through the propulsion jet 18.

The combustion apparatus 16 may be of any suitable construction and is here shown as comprising a plurality of flared burner tubes 23 provided with openings 24 in the walls thereof through which the compressed air may enter the tubes and mix with fuel oil or the like supplied to the burners as by means of the pipes 25. A suitable ignition means (not shown) may be provided for each burner.

The present invention is not limited to the details or arrangement of the structure thus far described, but is primarily concerned with the construction of a combined radial and double thrust bearing, generally indicated 27, which it is to be understood may be used in apparatus other than here shown. In the present embodiment, this bearing supports a shaft 28 connecting the rotor of the turbine 17 with the rotor of the compressor 15. This shaft may also be provided with bearings 29 and 31 of any suitable construction.

The bearings 27 and 31 are preferably supported from a reinforcing ring structure or bulk head 32, built into the casing 12, by means of struts 33 and 34 connected, as by welding, to the bearing housings and to bulk head. A conical sleeve 35 coaxial with the shaft 28 is connected to the bearing housings, the struts 34 being connected to this sleeve at the circumferential zone where a ring 36 is secured to the sleeve and housing of bearing 31.

The present invention is particularly concerned with the construction of the bearing 27 which is designed for thrust loads in either direction as well as radial loads on the shaft 28. The shaft is provided with a collar 37, preferably formed integral therewith, and which is substantially an isosceles trapezoid in section. A ring 38 disposed concentrically with respect to the collar 37 is supported from the outer casing by means of the previously-mentioned struts 33, any desired number of which may be provided. A split bearing housing 39 having interior end walls 40 is slidably received and secured within the ring 38 and carries split-ring bearing members 41 having tapered or conical bearing faces 42 to cooperate with the lateral bearing faces of the collar 37. Suitable spacers or shims 43 may be provided for properly locating the bearing members 41. The tapered bearing surfaces have been shown as disposed at an angle of approximately 45° to the shaft axis, it being assumed that the combined thrust and radial bearing is to be subjected to radial and thrust loads of substantially equal value. However, it will be understood that this angle may be changed depending upon the normal distribution of the radial and thrust loads.

The ends of the bearing housing may be closed by means of split sealing rings 44 secured to the housing and cooperating with the shaft 28 to prevent leakage of oil from the bearing 27. The seal may be effected by providing shallow spiral grooves 44a in the shaft-engaging surfaces of the rings directed and arranged to exert a viscosity pumping action opposing outward leakage along the shaft.

The shaft of the turbine illustrated may operate at speeds approximating 20,000 R. P. M. and be subjected to loads of large magnitude, due to rapid acceleration or deceleration of the aircraft as in taking off and landing, and consequently it is important that an oil film be maintained between the bearing surfaces under all conditions. To insure proper lubrication of the bearing, the tapered bearing surfaces of the collar 37 are each provided with a plurality of circumferentially-spaced radially-extending grooves 45 which have their outermost ends disposed short of the outer periphery of the collar, as shown particularly in Fig. 5, so as to be covered or lapped by the bearing surfaces 42. Oil is supplied to the inner ends of these grooves and flows outwardly along the grooves under the influence of centrifugal force to maintain a constant supply of oil under pressure in the bearing at all times.

The two bearing supporting struts 33 shown in Fig. 3 are tubular and serve to connect the bearing 27 with a suitable oil supply, which preferably includes an oil cooling device (not shown). The oil passes through the right-hand tubular strut 33 (Fig. 3) through the passage 46 to the inlet pipe 47 which communicates with a duct 48 (Fig. 3) provided in the bearing housing 39. The duct 48, in turn communicates with oil grooves or passages 49 provided in the ring bearings 41 and supplying the annular chambers 50 with which the inner ends of the grooves 45 communicate. Each chamber 50 is defined by the shaft 28, the collar 37, a bearing ring 41, and a sealing ring 44. The outer surface of the ring bearings 41 is undercut as indicated at 41a to facilitate fitting of the rings in the housing and provide annular spaces connecting ducts 48 with the grooves 49.

In order to be sure that the oil grooves 45 do not become clogged with foreign matter and to augment the oil circulation rate and, therefore, to aid in cooling of the oil by a suitable cooling device (not shown), the stationary bearing members 41 each may have one or more clean-out recesses 51 (Fig. 2) each recess being arranged to communicate with the outer ends of the associated collar grooves 45 in succession and once per revolution. The sudden relief in groove pressure provided by a recess results in forcible discharge of oil through the latter from the groove, whereby foreign matter is effectively flushed out of the grooves. Discharging oil enters an annular collecting space 52 and flows through duct 53 provided in the bearing housing 39 to outlet pipe 54 and the return passage 55 in the left-hand tubular strut 33 (Fig. 3) to the cooling device (not shown) for return to the inlet passage 46.

As shown particularly in Figs. 4, 5, and 6, the bearing surface between each of the grooves 45 is preferably provided with a relief or slight taper 56 extending from the trailing edge of each groove to substantially two-thirds the distance to the next groove to provide wedge-shaped spaces for oil.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a combined thrust and radial bearing, a stationary bearing member having a conical bearing surface, a rotary member having a conical bearing surface cooperating with the first bearing surface, the bearing surface of said rotary member having a circular series of grooves therein for supplying oil to said bearing surfaces, said grooves each having a radial component of direction, and terminating short of the outermost edge of its bearing surface so that its outer end is covered by the cooperating stationary conical bearing surface, means for supplying oil to the inner ends of said grooves, and means providing for discharge of oil from the outer ends of the grooves, and including recesses formed in the stationary bearing surfaces and arranged to communicate with the outer ends of the grooves as the collar rotates.

2. In a combined thrust and radial bearing, a rotary member having a collar fixed thereto, said collar having opposed conical bearing surfaces, stationary bearing means having spaced conical bearing surfaces cooperating with the conical bearing surfaces of said collar, the bearing surfaces of said collar each having a plurality of grooves formed therein, said grooves having a radial component of direction and terminating short of the outermost edge of its bearing surface so that its outer end is covered by the cooperating stationary conical bearing surface, means for supplying oil to the inner end of said grooves, and means providing for discharge of oil from the outer ends of the grooves, and including recesses formed in the stationary bearing surfaces and arranged to communicate with the outer ends of the grooves as the collar rotates.

3. In a combined thrust and radial bearing, a rotary member having a collar fixed thereto, said collar having opposed conical bearing surfaces, stationary bearing means having spaced conical bearing surfaces to cooperate with the conical bearing surfaces of said collar, the bearing surfaces of said collar each having a circular series of grooves formed therein, each of said grooves having a radial component of direction and having its outer end disposed short of the outer edge of the bearing surface in which it is formed so as to be covered by the cooperating stationary bearing surface, means for supplying oil to the inner ends of said grooves, and means providing for discharge of oil from the outer ends of the grooves, and including recesses formed in the stationary bearing surfaces and arranged to communicate with the outer ends of the grooves as the collar rotates, the collar bearing surfaces being relieved so as to define, with respect to the ring bearing surfaces, wedge-shaped spaces which are open to the trailing sides of said grooves.

4. In a thrust bearing, a rotary shaft provided with a collar having opposed conical bearing surfaces; a stationary housing enclosing the collar; a pair of bearing rings carried internally by the housing and having conical bearing surfaces for cooperation with the collar bearing surfaces; a circular series of grooves formed in each collar bearing surface; each groove having a radial component of direction and having its outer end disposed short of the outer edge of the bearing surface in which it is formed so as to be covered by the cooperating ring bearing surface; sealing means carried by the housing and cooperating with the shaft, the bearing rings, and the collar to define annular inlet chambers communicating with the inner ends of the grooves; said housing, the bearing rings, and the collar cooperating to define an annular outlet chamber; one or more clean-out recesses formed in each ring bearing surface at the outer edge thereof for placing the outer ends of the grooves of the cooperating collar bearing surface successively in communication with the outlet chamber as the collar rotates, and means providing for the admission of oil to the inlet chambers and for the discharge of oil from the outlet chamber.

5. In a thrust bearing, a rotary shaft provided with a collar having opposed conical bearing surfaces; a stationary housing having interior end walls joined by a circumferential wall forming an enclosure for the collar; a pair of bearing rings carried by the housing internally of the latter and having conical bearing surfaces for cooperation with the collar bearing surfaces; each of said bearing rings having a peripheral surface fitting said circumferential wall and an outer end surface; shim means interposed between said end walls and the outer end surfaces of the bearing rings; a circular series of grooves formed in each collar bearing surface; each groove having a radial component of direction and having its outer end disposed short of the outer edge of the bearing surface in which it is formed so as to be covered by the cooperating bearing ring conical surface; sealing means carried by the housing and cooperating with the shaft, the shim means, the bearing rings, and the collar to define annular inlet chambers in communication with the inner ends of the grooves; said circumferential wall, the bearing rings, and the collar cooperating to define an annular outlet chamber; one or more clean-out recesses formed in each bearing ring surface at the outer edge thereof for placing the outer ends of the grooves of the cooperating collar bearing surface successively in communication with the outlet chamber as the collar rotates; and means providing for the admission of oil to the inlet chambers and for the discharge of oil from the outlet chamber.

CHARLES C. DAVENPORT.